E. W. MASON AND C. D. MILLER.
ROAD MAP.
APPLICATION FILED AUG. 12, 1919.
1,395,508.
Patented Nov. 1, 1921.
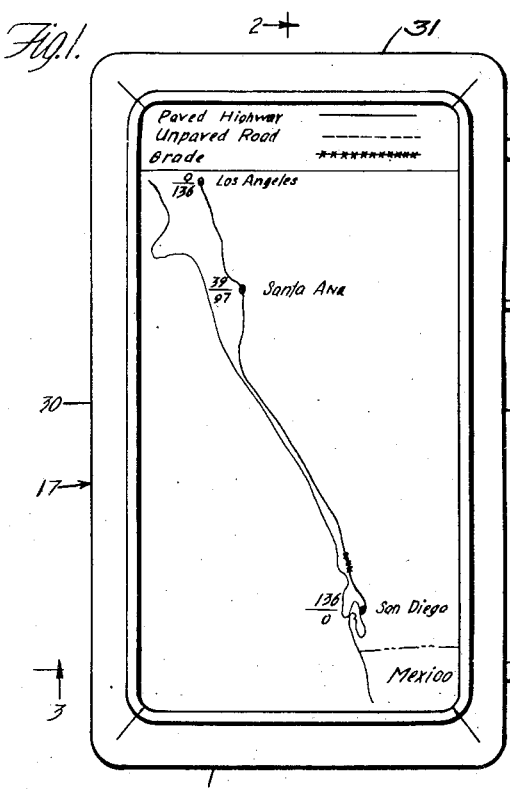
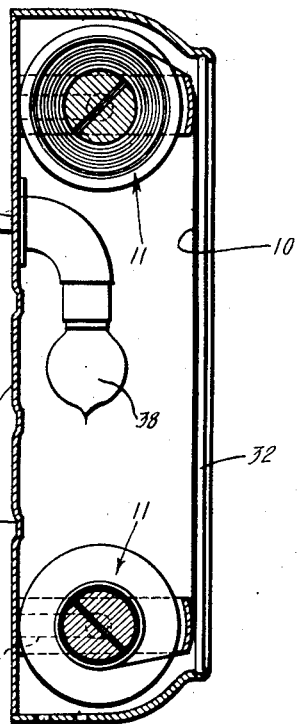
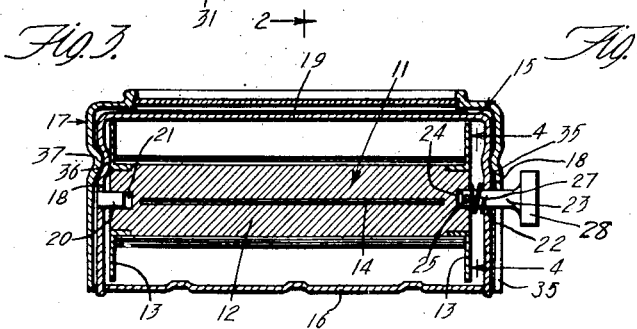
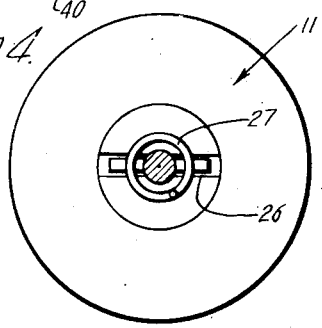
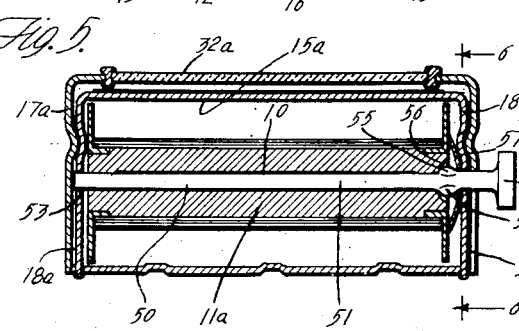
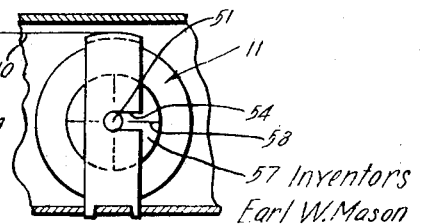
Inventors
Earl W. Mason
and Chester D. Miller
by
their Attorney.

UNITED STATES PATENT OFFICE.

EARL W. MASON, OF LOS ANGELES, AND CHESTER D. MILLER, OF SAN DIEGO, CALIFORNIA.

ROAD-MAP.

1,395,508.   Specification of Letters Patent.   Patented Nov. 1, 1921.

Application filed August 12, 1919. Serial No. 317,034.

*To all whom it may concern:*

Be it known that we, EARL W. MASON and CHESTER D. MILLER, citizens of the United States, residing at Los Angeles and San Diego, respectively, in the counties of Los Angeles and San Diego, State of California, have jointly invented new and useful Improvements in Road-Maps, of which the following is a specification.

This invention relates to maps to be used in connection with automobiles or other vehicles. It is an object of the invention to provide a road map that will be convenient, neat and simple.

When a motorist is traveling through a section of the country with which he is not familiar it becomes necessary for him to rely upon a book or a map for guidance. Books or the like are generally very unsatisfactory and maps are more generally used. In order for a map to contain the necessary information it must be of considerable size. Due to this fact guide maps are generally made fairly large and are arranged to be folded so that they may be conveniently carried. In order to use a map of this character it becomes necessary for the motorist to frequently unfold it so as to keep informed as to his location, etc. This not only becomes a great inconvenience but is also more or less unsatisfactory.

The present invention provides a map that overcomes these difficulties and is at the same time neat and simple. The invention embodies a map which is preferably made long and narrow. The map is carried on suitable spools which are mounted in a casing. The casing is provided with a glass front and the spools are mounted in the casing so as to cause a portion of the map to show under the glass. Means is provided for rotating the spools so as to cause the desired portion of the map to show below the glass. A light is also mounted within the casing in such a manner as to illuminate the map at night, the map being on transparent or semi-transparent material. The casing is a neat metallic box shaped member which may be conveniently mounted on the dash or any suitable part of the machine, preferably in sight of the driver. The map is made removable so that maps of various roads or parts of the country may be used.

A particular feature of the invention is the convenience and simplicity of arrangement. In order to move the map it is merely necessary to turn one of two knobs which project from the casing, the knob to be turned depends upon the direction in which the map is to be moved. The changing or replacing of maps is particularly simple as it is merely necessary to remove a portion of the casing and place in or remove a pair of spools.

Further features of the invention will be set forth in the following detailed description of a specific preferred form of the invention throughout which reference is had to the accompanying drawings, in which—

Figure 1 is a plan view of the device; Fig. 2 is a section taken as indicated by line 2—2 on Fig. 1; Fig. 3 is a sectional view taken as indicated by line 3—3 on Fig. 1; Fig. 4 is an enlarged detail section taken as indicated by line 4—4 on Fig. 3; Fig. 5 is a sectional view similar to Fig. 3, showing a modified form of construction; and Fig. 6 is a detail section taken as indicated by line 6—6 on Fig. 5.

Throughout the drawings numeral 10 designates the map which is carried on spools 11. The map 10 is preferably long and narrow so that it can be carried on spools of convenient size. One roll or map may have on it only one road or section of country or it may have on it several roads or several different sections of the country. The map preferably shows the main roads the principal cities, grades, distances, etc., and any other suitable information.

The maps may be made of fairly tough paper which is more or less transparent. The maps being of such a paper are durable and may be well illuminated as will be hereinafter described.

The spolls 11 are of simple construction comprising a cylindrical block 12 and end flanges 13. The cylindrical block 12 may be made of any suitable material such as wood or fiber and the flanges 13 may be formed from sheet metal. The flanges are preferably mounted on the back as shown in the drawings. The cylindrical blocks 12 have slots 14 extending diametrically through them in which the ends of the map may be held. The flanges 13 are made high enough so that a map may be carried on a single spool without projecting beyond the flanges.

Two spools are used in connection with one map, the spools being spaced a short distance apart with the map extending between them. The map is rolled on the spools so that its face or printed side faces out. The spools are removably carried in definitely spaced relation by brackets 15. The brackets 15 are mounted on the base or bottom 16 of casing 17. Each bracket 15 is formed from a single piece of sheet metal and has ends 18 and a top 19. In the form of construction shown in Figs. 1, 2, 3 and 4 a pin 20 projects inwardly from one of the ends 18 and engages a hole 21 in the end of the spool. In the other end 18 there is a hole 22 through which a pin 23 passes. The pin 23 extends into a hole 24 in the spool. In the end of the pin 23 which extends into the hole 24 there is a pin 25 which extends diametrically through the pin 23 and projects outwardly from each side of it. The pin 25 fits in a slot 26 which extends diametrically across the ends of block 12. Around pin 23 and between the pin 25 and end 18 there is a spring 27 which keeps pin 25 in slot 26 and presses against the spool 11 so as to prevent it from moving or rattling due to vibration or jarring. On the outer end of pin 23 there is a knurled knob 28. The knob 28 is outside of casing 17 and rotation of the knob 28 will cause rotation of spool 11 due to the engagement of pin 25 in slot 26. Both spools 11 are mounted in the same manner so that the map can be moved in either direction. The tops 19 of brackets 15 extend between the tops of ends 18 and are slightly crowned as shown in the drawings. The spools fit between the base 16 and the top 19. When the spools are in position in the brackets the map extends between the spools and over the tops 19. This arrangement, and the friction caused by spring 27, causes the portion of the map which extends between the tops 19 to be smooth and flat.

The casing 17 completely incases the brackets 15 and the map 10. The sides 30 and the ends 31 of the casing are preferably formed from a single piece of sheet metal. A glass plate 32 forms the top of the casing and makes it possible to see the portion of the map which extends between the tops 19 of brackets 15. In one of the sides 30 of the casing there are slots 35 in which the pins 23 fit. This construction allows the upper portion of the casing to be easily removed from the base 16. In each end 18 there is an indentation 36 and in the sides 30 of the casing there are indentations 37 which register with the identations in the ends. There is enough spring in the various parts to allow the upper portion of the casing to be pressed into position so that the indentations in the casing register with the indentations in the brackets. When the indentations in the casing engage the indentations in the brackets the upper portion of the casing is held firmly in position. When it is desired to put a different map in the device the upper portion of the casing is lifted off; the spools carrying the map may then be removed by pulling pins 23 out of engagement with holes 24 and pulling the spools to either side out of the brackets.

In order to illuminate the map at night a light 38 may be mounted within the casing 17 so that when it is on the light shines through the map. The light being under the map, which is made of suitable transparent paper, eliminates any glare such as there would be if the light was shining on the face of the map. The light may be controlled by a suitable push button 39 which projects beyond the casing 17 and is arranged in relation to the casing in the same manner as the pins 23. In order to prevent the casing, etc., from becoming heated when the light is burning ventilating holes 40 are provided in the casing. The holes 40 are preferably made in the bottom or lower end of the casing so as to prevent moisture and dirt from getting into the casing.

The spool construction and the means for holding the spool and other details are merely typical. Figs. 5 and 6 show a form of construction which may be used. In Figs. 5 and 6 is shown a construction wherein the spool 11$^a$ has a hole 50 extending completely through it. A pin 51 fits into the hole 50 and projects from both ends of the spool. In one end 18$^a$ of bracket 15$^a$ there is a hole 53 in which one end of pin 51 is carried. In the other end 18$^a$ there is a slot 54 in which the other end of pin 51 is carried. The pin 51 has expanded portions or ears 55 which engage a groove 56 in the end of spool 11$^a$. Around the pin 51 and between the spool 11$^a$ and the end 18$^a$ there is a spring washer 57. In the washer 57 there are slits 58 which allow it to have sufficient resilience. The end of the pin 51 which has the ears 55 extends from the casing and has a knob 59 on it. The casing 17$^a$ is substantially the same as casing 17 in the other form of construction and has a slot 35$^a$ in it which allows the upper portion of the casing to be pressed into position. The spring washer 57 keeps the spool tight and frictionally opposes its rotation. Turning of knob 59 will cause rotation of spool 11$^a$ due to the engagement of ears 55 in slot 56. To remove the spool 11$^a$ it is merely necessary to remove the upper part of the casing and pull the pin 51 out of notch 54. The pin 51 may be easily pulled out of the spool. When the pin 51 is out the washer 57 cannot be removed due to the fact that it is between the ears 55 and the knob 59. There may be a slot in spool 11 similar to slot 14 in the other form of construction. Although the slot intersects the hole 50 and the map extends across the hole before the pin 51 is pushed into the spool, it has been found in practice that the pin when pushed through the hole pushes the map to one side and holds it tightly between the pin and the wall of the hole as shown in Fig. 5.

In Fig. 5 is shown a means for holding the glass 32ª in the casing 17ª. A T-shaped beading of soft brass or the like is placed between the glass and the edge of the metallic casing. When the glass is in place the beading is hammered so as to be I-shaped as shown in the figure.

The casing may be mounted on any convenient part of the machine. In the base 16 there are numerous circular depressions 60 which are partially punched holes. The holes may be completely punched by a center punch or the like. When the casing is being mounted it is merely necessary to punch out holes which can be advantageously used.

Having described a preferred form of the invention we wish to reserve to ourselves any changes or modifications that may appear to those skilled in the art or fall within the scope of the following claims.

Having described a preferred form of our invention, we claim:

1. In a device of the character described, a casing having a sight opening, U-shaped brackets mounted in the casing one near the upper end and the other near the lower end of the sight opening, spools mounted horizontally in said brackets, the center parts of said brackets extending across the front of the spools and forming guides near the sight opening, a strip of thin flexible material wound upon the spools and extending between them over the guides and across the sight opening; and means frictionally opposing rotation of each spool.

2. In a device of the character described, a casing having a sight opening, two spools slotted at their ends and having apertures extending longitudinally through them, two pins arranged to extend through the apertures in the spools, the pins forming carriers for the spools and extending from the ends of the spools, means for positively preventing relative rotation between the spools and the pins, said means comprising projections extending from the pins to engage the slots in the spools, means for rotatably and removably mounting the pins in the casing, means frictionally opposing rotation of each spool, and a sheet of thin flexible material carrying a map carried on and between the spools.

3. In a device of the character described, a casing having a sight opening, two spools removably mounted in and at opposite ends of the casing, the spools being formed with slots diametrically through them and bores longitudinally through them to intersect the slots, a sheet of thin flexible material carrying a map adapted to be removably carried on and between the spools, and means for detachably connecting the sheet of material to the spools, said means comprising pins adapted to be arranged in the bores in the spools when portions of the sheet of material are arranged through the slots in the spools.

4. In a device of the character described, a casing having a sight opening, U-shaped brackets mounted in the casing at opposite ends thereof, pins removably and rotatably carried between the sides of the brackets, spools carried on the pins, the center parts of said brackets extending across the front of the spools and forming guides near the sight opening, and a strip of thin flexible material upon the spools and extending between them over the guides and across the sight opening.

5. In a device of the character described, a casing comprising a base and a removable notched body having a sight opening, two U-shaped brackets mounted on the base at opposite ends of the casing, each of said brackets having an apertured side and a notched side, two pins, one arranged in connection with each bracket, the pins being adapted to extend into the apertures and notches in the brackets, the body of the casing being adapted to be arranged so that the notches therein carry the pins and hold them against displacement from the brackets, a spool carried on each pin, and a strip of thin flexible material wound upon the spools to extend between them and across the sight opening.

6. In a device of the character described, a casing comprising a base, and a removable notched body having a sight opening, two U-shaped brackets mounted on the base to be within the casing and at opposite ends of the casing, each of said brackets having an apertured side and a notched side, two pins rotatably and removably arranged in connection with the brackets, the pins being adapted to extend into the apertures and notches in the brackets, the body of the casing being adapted to be arranged so that the notches therein carry the pins and hold them against displacement from the brackets, the pins being sufficiently long to extend from the casing and be rotatable from the exterior of the casing, spools carried on the pins and within the brackets, means frictionally opposing rotation of each spool, means for holding the spools and pins against relative rotation, the center portions of the bracket extending across the front of the spools and forming guides near the sight openings, a strip of thin flexible material wound on the spools and extending between them over the guides and across the sight opening, and illuminating means within the casing under the sight opening.

7. In a device of the character described, a casing comprising a base and a removable notched body having a sight opening, two U-shaped brackets mounted on the base at opposite ends of the casing, each of said brackets having an apertured side and a notched side, two pins, one arranged in connection with each bracket, the pins being adapted to extend into the apertures and notches in the brackets, the body of the casing being adapted to be arranged so that the notches therein carry the pins and hold them against displacement from the brackets, a spool carried on each pin, means frictionally opposing rotation of each spool, and a strip of thin flexible material wound upon the spools to extend between them and across the sight opening.

8. In a device of the character described, a casing comprising a base and a removable notched body having a sight opening, two U-shaped brackets mounted on the base to be within and at opposite ends of the casing, each of said brackets having an apertured side and a notched side, two pins rotatably and removably arranged in connection with the brackets, the pins being adapted to extend into the notches and apertures in the brackets, the body being adapted to be arranged so that the notches therein receive the pins allowing them to project from the casing and preventing them from being displaced from the brackets, spools having apertures extending longitudinally through them and slots extending diametrically through them to intersect the longitudinal apertures, the spools being arranged on the pins so that they extend through the apertures in the spools and to be within the brackets, means frictionally opposing rotation of each spool, illuminating means arranged within the casing below the sight opening, the center portions of the brackets extending across the front of the spools and forming guides near the ends of the sight openings, and a strip of thin flexible material wound on the spools and extending between them over the guides and across the front of the sight opening between the sight opening and the illuminating means.

In witness that we claim the foregoing we have hereunto subscribed our names this 6th day of August, 1919.

EARL W. MASON.
CHESTER D. MILLER.

Witness:
VIRGINIA I. BERINGER.